INVENTORS
FRANK C. OROPEZA
& JACK T. MURRAY
BY Hurwitz, Rose & Greene
ATTORNEYS

INVENTORS
FRANK C. OROPEZA
& JACK T. MURRAY

BY Hurvitz, Rose & Greene
ATTORNEYS

United States Patent Office 3,454,883
Patented July 8, 1969

3,454,883

BINARY FREQUENCY SYNTHESIZER WITH ALTERNATING OFFSET FREQUENCY TECHNIQUE

Frank C. Oropeza, Winter Park, Fla., and Jack T. Murray, Raleigh, N.C., assignors to Melpar, Inc., Falls Church, Va., a corporation of Delaware Filed Nov. 17, 1966, Ser. No. 595,165
Int. Cl. H03b *19/06*
U.S. Cl. 328—14 9 Claims

ABSTRACT OF THE DISCLOSURE

A frequency synthesizer generates $2^n$ discrete offset frequencies related to values of the bits in a binary code of $n$ bits from $m$ distinct pairs of signal frequencies. The synthesizer has $n$ stages of synthesis to which the distinct pairs of signal frequencies are applied in a repeating order of $m$ distinct pairs to each group of $m$ stages in the succession of $n$ stages. Each of the stages has a pair of signal gates responsive respectively to inverse values of a bit of the binary code to pass a respective one of the pair of signal frequencies applied to that stage to a difference mixer for mixing that signal frequency with the carry frequency of the preceding stage, or with a reference frequency in the case of the first stage. The difference frequency from the mixer of each stage is supplied to a frequency divider in the respective stage for division by 2, to supply a carry frequency to the next successive stage. The carry frequency generated by the last stage of the synthesizer is thereby dependent upon the specific coding of bits applied to the various stages, and constitutes the synthesized frequency for that specific coding.

The present invention relates generally to frequency synthesis, and more particularly to a binary frequency synthesizer with alternating offset frequency.

In the past it has been common to provide digital code-related discrete step frequencies for purposes of scanning communication channels, switching applications for radar and surveillance receivers, and a host of other practical applications requiring generation of stepped variable frequencies or signals. In the case of decimal synthesis, for example, the usual method employed for synthesizing the desired frequencies has been to supply 10 harmonically related frequencies to each of a plurality of stages of synthesis, each stage adapted to select any one of the supplied frequencies, to mix the selected frequency with the output frequency of the preceding stage (initially derived from the mixing of a variable oscillator frequency with the selected frequency of the first stage), to filter the sum or difference output of the mixture, to divide the filter output by a factor of 10, to again filter the divider output, and to feed the resulting frequency to the mixer of the next successive stage. Each stage then has a capability of generating a number of frequencies which depends on the number of frequencies generated by the preceding stages, the discrete output frequencies generated by the overall circuit being related to a decimal code. Binary synthesis is accomplished in a corresponding manner except that the radix used for number of frequencies supplied and for division in each stage is 2 rather than 10. Alternatively, binary or decimal synthesis has been achieved, as desired, by use of conventional digital conversion schemes in conjunction with a prior art synthesizer of the type described.

Variations of this prior art frequency synthesizer have been proposed, but in general the same technique is utilized for processing the several frequencies involved.

The present invention resides in the provision of a binary frequency synthesizer requiring a much smaller number of fixed frequencies and utilizing an alternating offset frequency technique wherein two distinct sets of fixed frequencies are applied to the several synthesis stages, one set to each even-order stage and the other set to each odd-order stage, i.e., each set of fixed frequencies is delivered to alternate stages in the synthesis chain and only one frequency of each set is processed through a stage at any one instant of time. This may be achieved by use of a binary code applied to gating means in each stage, one frequency or the other being passed by the gating means in accordance with the enabling logic levels applied to the gating means. The frequency passed by the gating means is mixed with the carry frequency of the immediately preceding synthesizer stage and the sum or difference output of the mixer subjected to division by two. The carry frequencies so obtained for the stage under consideration are therefore dependent on the frequency separation between adjacent frequencies in the sets of fixed frequency and constitute an alternating frequency offset. Each stage generates or has the capability of generating a number of output frequencies equal to $2^n$ where $n$ is the number of that stage, so that $2^n$ output frequencies may be generated by a synthesizer having $n$ stages.

According to one embodiment of the invention, each synthesis stage is provided with a pair of signal gates, each gate responsive to a specified enabling bit and to a different one of the two fixed frequencies of the set applied to that stage to pass the respective frequency. The enabling binary logic level for each gate of the stage is the inverse of the logic level that enables the other gate. Hence, only one fixed frequency applied to each stage is excited by the applied logic level, i.e., passed by the respective signal gate. The selected frequency is applied to a mixer to which is also applied a pre-selected starting frequency, for the first stage, or the carry frequency generated by the immediately preceding stage, for each stage other than the first stage, and the difference output of the mixer supplied to a frequency divider for division by two, the output of the divider constituting the carry frequency for that stage.

In another embodiment of the invention, one of the fixed frequencies of each pair of fixed frequencies is shared by, i.e., is common to, both even and odd order synthesis states.

The use of two sets of fixed frequencies, each set applied to alternate stages of the synthesizer chain, is effective to reject or substantially reject the spurious frequencies and noise which may be present in the band of frequencies encompassed by each separate set. In this respect, it will be noted that a frequency divider is a dominant mode device effective to separate the desired signal from the vicinity of unwanted spurious signals and noise. Since adjacent stages are subjected to different sets of frequencies, i.e., to frequencies lying within at least relatively different bands, and the difference output of the mixer of each stage is frequency divided so that filtering of the spurious from the carry frequency is achieved, filter requirements of each stage, as well as number of fixed frequencies required to be applied to the overall synthesizer, are significantly reduced. In addition, one mixing function for each stage is sufficient to accomplish the desired synthesis.

Accordingly, it is a principal object of the present invention to provide a binary frequency synthesizer utilizing an alternating offset frequency synthesis technique.

Another object of the present invention is to provide a binary frequency synthesizer having several synthesis stages and in which only two distinct sets of fixed frequencies are required to achieve the desired synthesis, with substantial filtering of spurious, each set applied to an alternate stage of the synthesizer.

It is a further object of the present invention to provide a binary frequency synthesizer in which a significant improvement in spurious rejection is achieved with a simultaneous reduction in filtering requirements, relative to the spurious rejection and filter requirements of prior art synthesizers.

The above and still further objects, features and attendant advantages of the present invention will become apparent from a consideration of the following detailed description of certain preferred but non-limiting embodiments thereof, especially when taken in conjunction with the accompanying drawings, in which.

Figure 1:
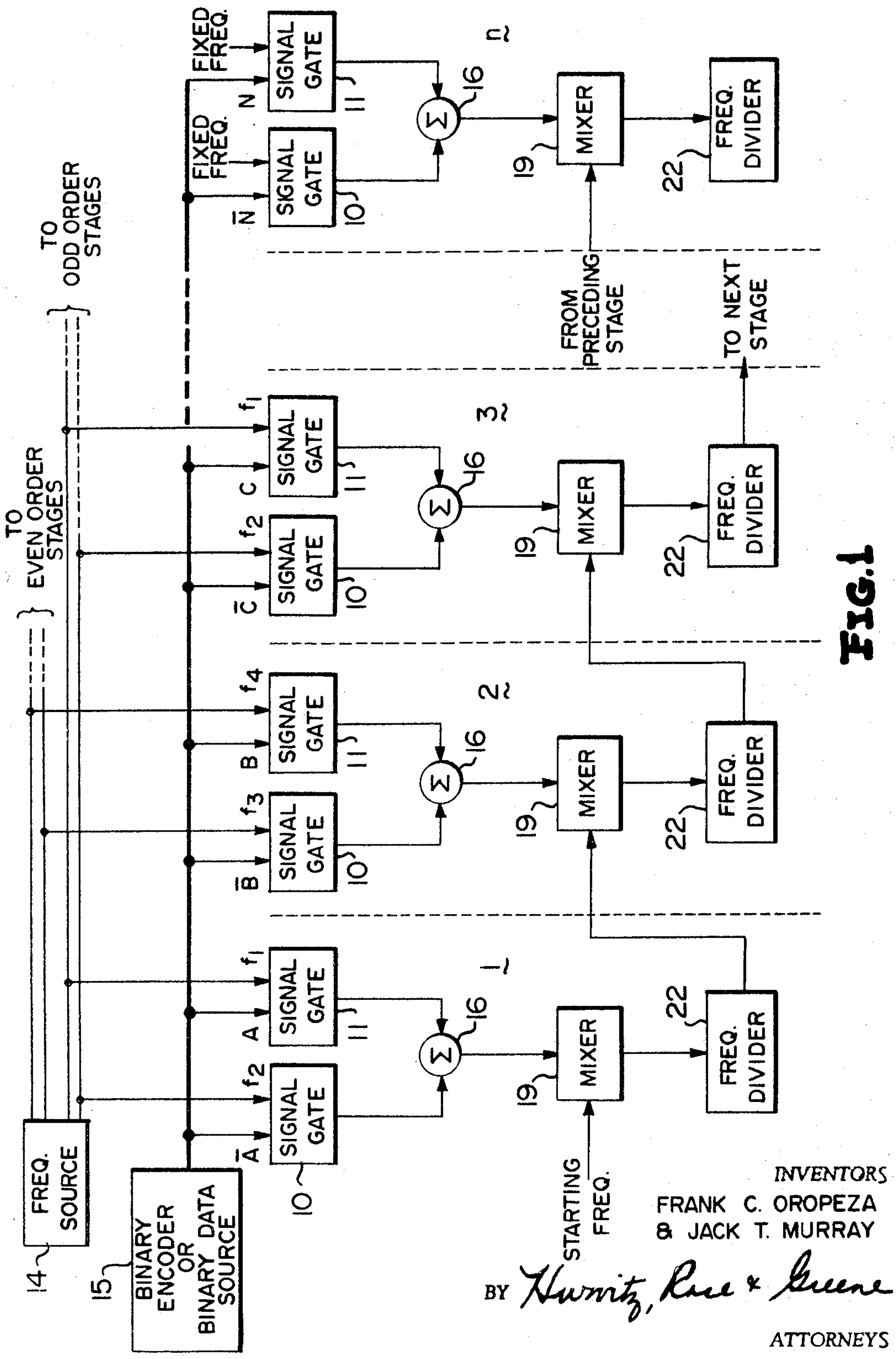
FIGURE 1 is a circuit diagram of one embodiment of the invention.

With reference now to FIGURE 1, a preferred embodiment of the present invention is a binary frequency synthesizer including a plurality of synthesis stages designated by reference numerals 1, 2, 3, . . . *n*. Each stage includes a pair of conventional signal gates 10 and 11, each gate having a pair of input terminals, to one of which is applied a fixed frequency of a preselected pair of fixed frequencies and to the other of which is applied a binary logic level, and an output terminal from which the input signal frequency is passed when the respective signal gate is enabled for passage of signal by its applied logic level. The other signal gate of each stage is generally similar to the first-mentioned gate except that it is enabled for passage of signal by a logic level which is the inverse, in binary logic terminology, of the logic level applied to the first-mentioned gate. In addition, the signal frequencies applied to the two gates of any one stage are unrelated, have a preselected frequency separation, and constitute one of two distinct pairs of fixed frequencies.

Each set of fixed frequencies is applied to an alternate stage of the synthesizer, that is, frequencies *f*1 and *f*2 are applied to odd-order stages 1, 3, and so forth, and fixed frequencies *f*3 and *f*4 are applied to even-order stages 2, 4, and so on. The two sets of fixed frequencies may be supplied by any conventional source or sources of frequency, designated by reference numeral 14. Similarly, the logic level applied to the gates of each stage may be obtained from any conventional source of binary coded logic, such as an encoder or data source 15, the logic levels for the several stages being designated by reference characters A, $\overline{A}$, B, $\overline{B}$, C, $\overline{C}$, . . . N, $\overline{N}$.

The outputs of the two gates of each stage are applied to a summing node or junction 16 in that stage, although it will be understood that only one signal gate of a particular stage can be enabled at any given instant of time, and thence to a mixer 19 which may be implemented to provide a sum output, a difference output, or both sum and difference outputs, a difference mixer being preferred. In the case of the first stage, mixer 19 is also supplied with a preselected starting or reference frequency to provide the desired output frequency which will ultimately result in the carry frequency determining the values of the several discrete output frequencies to be generated by the overall synthesizer. The difference output of the mixer is applied to a frequency divider 22 for division by two, and the divider output used as the carry frequency for application to mixer 19 of the next successive stage, stage 2 in this case.

Stage 2, and all succeeding stages for that matter, are implemented and operate in the same manner as stage 1, except that one mixer input for each of the remaining stages is the carry frequency of the immediately preceding stage and all odd-order stages are supplied with frequencies *f*1 and *f*2, while the even-order stages are supplied with frequencies *f*3 and *f*4.

In operation of the synthesizer of FIGURE 1, assuming for the sake of example that frequency *f*1=28 megacycles, *f*2=29 mc., *f*3=26 mc., *f*4=27 mc., and the starting or reference frequency is selected as 8 megacycles, it will readily be observed that application of logic level $\overline{A}$ to signal gate 10 results in the passage by that gate of a signal having a fixed frequency of 29 mc. to mixer 19. The output of difference mixer 19 is therefore 29 mc.—8 mc.=21 mc., and following division of the difference output by frequency divider 22, the carry frequency of the first stage becomes 10.5 megacycles. Similarly, for application of logic level A to signal gate 11, it will be observed that the carry frequency becomes 10.0 mc. When this operation is carried through the remaining stages it will be noted that each stage is capable of generating a number of frequencies equal to $2^n$, where *n* is the number of the stage in question, so that a synthesizer composed of four stages, for example, can generate up to 16 discrete frequencies having a binary data relationship. The initial frequency separation of the applied mixed frequencies depends upon the desired binary expression for a given resolution and bandwidth.

For a binary logic level or bit $\overline{B}$ applied to stage 2, and a binary logic level or bit $\overline{A}$ applied to stage 1, the output of the second stage, for the above-assumed frequencies, becomes 7.75 mc. In a similar manner, code combinations for stages 1 and 2 of A, $\overline{B}$; $\overline{A}$, B; and A, B; result in carry frequencies from frequency divider 22 of stage 2 of 8.0, 8.25, and 8.5 mc. For a four stage binary frequency synthesizer, similar considerations for the last stage, i.e., stage 4, will show that 16 possible combinations of logic levels are available and each combination may be selected to synthesize a discrete offset output frequency-to-binary data relationship.

As noted above, the mixer for each stage may be a sum or a difference mixer. However, difference mixers are preferred to eliminate or substantially eliminate the spurious frequencies produced by related harmonics of the fixed frequencies. Normal binary code-to-frequency output relationship is lost when difference mixers are utilized, however, so that the frequency-binary data correspondence must be inverted to restore the relationship. This is accomplished, for example, by utilizing the $\overline{A}$ logic level (for example, a binary "one") to enable the signal gate to which the higher fixed frequency of the first set of fixed frequencies is applied, and carrying this correspondence through for all odd-order stages. That is, logic level $\overline{C}$ is also applied to signal gate 10 for stage 3 to excite the higher fixed frequency, 29 mc. in the case of the exemplary values assumed above. For stage 2 and all remaining even-order stages, this relationship is inverted, e.g., by employing $\overline{B}$ to enable the gate to which the lower frequency of the set is applied, in the specific case of stage 2. Accordingly, the final output stage (the *n*th stage) of the binary synthesizer must be an even-order stage in order to maintain the normal binary data-to-output frequency relationship.

Figure 2:
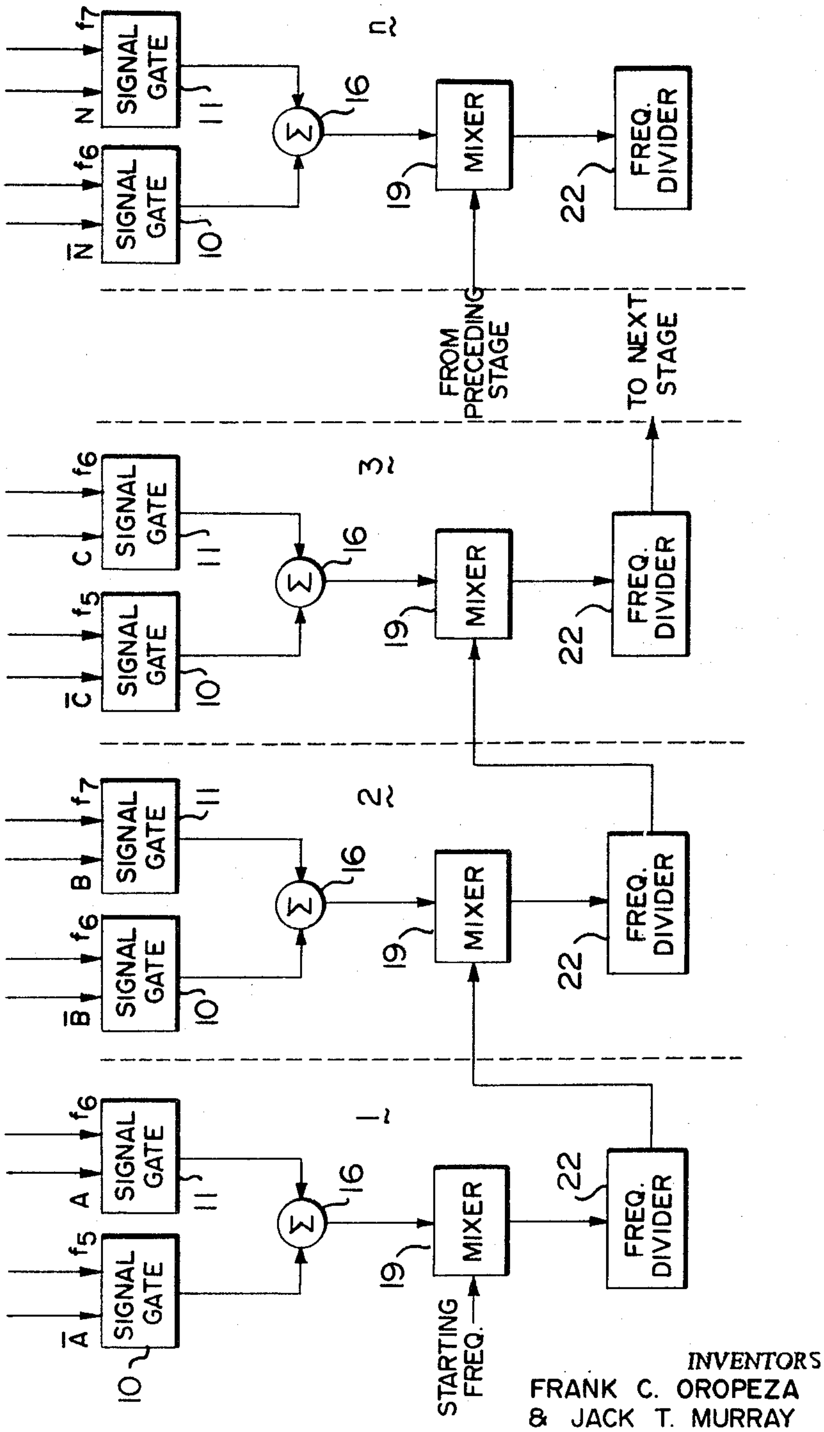
FIGURE 2 is a circuit diagram of another embodiment of the present invention.

Referring now to FIGURE 2, another embodiment of the present invention is a binary frequency synthesizer of generally similar structure to that of the embodiment of FIGURE 1, but wherein the odd and even-order stages share a common frequency of the two sets of frequencies applied to alternate stages. Thus, for example, separated and unrelated frequencies *f*5 and *f*6 are applied to stages 1, 3, and remaining odd-order stages, while another set of unrelated and separated frequencies *f*6 and *f*7 are applied to all even-order stages. Frequency *f*6, then, is common to all stages, but may be considered as part of two distinct sets of fixed frequencies which are applied to alternate synthesis stages of the frequency synthesizer. The synthesizer of FIGURE 2 operates in generally the same manner as that of FIGURE 1; further elaboration on the circuit and its operation are therefore unnecessary.

It is also possible to provide more than one alternating frequency offset simply by increasing the number of fixed frequencies in such a manner that every group of *m* synthesis stages repeats as to the frequency range, where *m* is an integer greater than or equal to 2. For example, if $m=3$, three sets of fixed frequencies are employed and the three sets repeated in the same order of application to each successive group of three stages of the synthesizer. In such a case, $n$ stages are required, where $n$ is $\geqq 2m$. This repetition of applied fixed frequencies over three or more stages of the synthesizer is preferable only in those situations where the total number of frequencies to be synthesized is quite large. For eight stages of synthesis, for example, it is preferable to use only two distinct sets of fixed frequencies, as indicated in the embodiments of FIGURE 1 or FIGURE 2, 256 synthesized output frequencies being thus available.

While we have disclosed certain preferred embodiments of our invention, it will be apparent to those skilled in the art to which our invention pertains that variations in the specific details of construction and operation which have been illustrated and described may be resorted to without departing from the spirit and scope of the invention, as defined in the appended claims.

We claim:

1. Means for synthesizing $2^n$ discrete offset frequencies, related to values of the bits in a preselected binary code of $n$ bits, from $m$ distinct pairs of fixed signal frequencies, where $m$ is an integer greater than or equal to 2 and $n$ is an integer equal to a multiple of $m$ greater than or equal to $2m$, the signal frequencies of each of said distinct pairs having a preselected frequency separation upon which the offset of the synthesized frequencies is dependent, said means comprising:

$n$ stages of synthesis;

means applying said distinct pairs of signal frequencies to said $n$ stages in a repeating order of $m$ distinct pairs to each group of $m$ stages in the succession of $n$ stages;

each of said $n$ stages including a pair of signal gates, each gate responsive to a bit of said binary code of one preselected value for enabling passage of signal therethrough, the enabling bit for one of said pair of gates having the inverse of the value of the enabling bit of the other of said pair of gates whereby only one of said pair of gates may be enabled at a time, each gate further responsive to a different signal frequency of the pair of signal frequencies applied to the stage for passage thereof upon application of the respective enabling bit to that gate, a mixer responsive to the signal frequency passed by said pair of gates and to a further frequency, and a frequency divider responsive to the output frequency of said mixer for division of said mixer output frequency by a factor of 2, to generate a carry frequency for the stage;

means for applying a preselected fixed starting frequency as said further frequency to the mixer of the first of said $n$ stages;

means for applying the carry frequency generated by the frequency divider of a stage as said further frequency to the mixer of the next successive stage, for each of the remaining of said $n$ stages;

the carry frequency generated by the frequency divider of the last of said $n$ stages constituting the synthesized frequency for the specific values of the $n$ bits in said binary code applied to said $n$ stages.

2. The invention according to claim 1 wherein $m=2$.

3. The invention according to claim 1 wherein said means for applying signal frequencies includes means for supplying one frequency of each of said $m$ distinct pairs of signal frequencies in common in all $m$ of said pairs of signal frequencies.

4. The invention according to claim 1 wherein said mixer comprises means for generating only the sum of the frequencies applied thereto.

5. The invention according to claim 1 wherein said mixer comprises means for generating only the difference of the frequencies applied thereto.

6. The invention according to claim 5 wherein the gate to which the higher signal frequency is applied in each of the odd-order stages includes means for enabling that gate in response to a bit having a value identical to that enabling the gate to which the lower signal frequency is applied in each of the even order stages of said $n$ stages.

7. A frequency synthesizer comprising means for generating a plurality of distinct pairs of fixed signal frequencies, each signal frequency being separated from the other signal frequency of that pair by a preselected frequency;

means for generating a binary code to be synthesized in the form of offset frequencies by said synthesizer;

a multiplicity of synthesizing stages, each of said stages including means for combining a signal frequency with the carry frequency from the immediately preceding stage to generate a combined frequency, and means responsive to said combined frequency for division thereof by a predetermined factor as the carry frequency of the respective stage;

means for applying said plurality of distinct pairs of signal frequencies in a repeating order to each plurality of stages equal in number to said plurality of pairs of signal frequencies, in the succession of said multiplicity of stages, one pair of signal frequencies to a stage;

means for applying a reference frequency as the carry frequency to the first synthesizing stage;

each stage further including means for gating one signal frequency of the pair applied to that stage in response to a bit of said binary code, and for gating the other signal frequency of that pair in response to the inverse of said bit;

means for applying bits of said binary code from said code generator to said gating means in respective ones of said stages;

means for applying said carry frequency of each stage to said combining means of the next successive stage, the carry frequency of the last stage constituting the synthesized frequency for the binary code applied to said gating means during production of the last named carry frequency.

8. The invention according to claim 7 wherein said plurality of distinct pairs of signal frequencies is two pairs, and wherein said multiplicity of synthesizing stages is an integral multiple of 2.

9. The invention according to claim 8 wherein said means for applying said pairs of signal frequencies to said stages includes means for supplying a single fixed signal frequency as one of the two signal frequencies applied to each stage.

References Cited

UNITED STATES PATENTS

| | | | |
|---|---|---|---|
| 3,227,963 | 1/1966 | Dimmick | 331—38 X |
| 3,293,561 | 12/1966 | Hegarty et al. | 331—38 |
| 3,331,035 | 7/1967 | Strickholm | 328—14 X |
| 3,372,347 | 3/1968 | Jones et al. | 331—39 |

JOHN S. HEYMAN, *Primary Examiner.*

U.S. Cl. X.R.

331—38